United States Patent
Beaver

(10) Patent No.: US 6,305,081 B1
(45) Date of Patent: Oct. 23, 2001

(54) INSTALLING AND SERVICING AN HVAC SYSTEM

(75) Inventor: Danny D. Beaver, Tyler, TX (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/187,359

(22) Filed: Nov. 6, 1998

Related U.S. Application Data

(62) Division of application No. 08/762,896, filed on Dec. 10, 1996, now Pat. No. 6,269,840.

(51) Int. Cl.[7] ..................................................... B21K 1/20
(52) U.S. Cl. ......................... 29/890.124; 29/890; 29/121
(58) Field of Search ................ 62/77, 149, 292; 137/15, 315, 317, 320, 321, 596.2, 637.2, 637.4, 614.18, 614.19, 798, 614.17, 614.16; 29/890.124, 890.14, 890.121

(56) References Cited

U.S. PATENT DOCUMENTS

| | | | |
|---|---|---|---|
| 1,099,418 | * 6/1914 | Aughenbaugh | .................... 137/637.2 |
| 2,512,090 | 6/1950 | Cooper . | |
| 2,518,212 | 8/1950 | Wilson . | |
| 2,934,915 | 5/1960 | Morse . | |
| 3,208,232 | 9/1965 | Madison et al. . | |
| 3,225,554 | 12/1965 | Alexander . | |
| 3,243,969 | 4/1966 | Dirk . | |
| 3,645,496 | 2/1972 | Rawlins . | |
| 3,721,264 | * 3/1973 | Coughlin | ........................... 137/596.2 |
| 3,765,450 | * 10/1973 | Meges | ................................ 137/596.2 |
| 3,882,688 | 5/1975 | Honnold, Jr. . | |
| 3,916,947 | 11/1975 | Holmes et al. . | |
| 3,933,174 | * 1/1976 | Kanomata | ........................ 137/614.18 |
| 3,982,561 | * 9/1976 | Harthun | ............................ 137/596.2 |
| 4,418,716 | 12/1983 | Starke . | |
| 4,644,973 | 2/1987 | Itoh et al. . | |
| 4,796,436 | 1/1989 | Voorhis et al. . | |
| 5,067,521 | 11/1991 | Jenks et al. . | |
| 5,139,049 | 8/1992 | Jensen et al. . | |
| 5,339,862 | 8/1994 | Haunhorst . | |
| 5,357,763 | 10/1994 | Vogel . | |
| 5,415,200 | 5/1995 | Haunhorst et al. . | |
| 5,467,964 | 11/1995 | Ekman . | |

FOREIGN PATENT DOCUMENTS

WO9504238  2/1995 (WO) .
WO9516163  6/1995 (WO) .

* cited by examiner

Primary Examiner—S. Thomas Hughes
Assistant Examiner—T. Nguyen
(74) Attorney, Agent, or Firm—William J. Beres; William O'Driscoll

(57) ABSTRACT

A valve in valve assembly. The assembly comprises a housing having an internal passage, a valve body in the housing and movably operable to control process fluid flow through the passage, and a chamber in the valve body. The chamber is open to the passage at a first chamber end. A valve core in the chamber controls service fluid flow the chamber.

12 Claims, 9 Drawing Sheets

INSTALLING AND SERVICING AN HVAC SYSTEM

This is a Divisional Application of U.S. patent application Ser. No. 08/762,896 filed on Dec. 10, 1996 in the name of Beaver now U.S. Pat. No. 6,269,840.

BACKGROUND OF THE INVENTION

The present invention is directed to a valve-in-valve body arrangement, vent port and method of use for service valves, process fittings or service adapters which simplifies the existing apparatus and methods.

Present service valves include a process path from an inlet to an outlet with an external aperture holding a solid valve body. The solid valve body is externally controlled so that it can move and block the process path but performs no other functions. Charging and evacuating are accomplished in other ways including through the use of a process fitting. The process fitting requires a further aperture, the addition of valve fitting itself, machining, and assembly.

These service valves are attached in the factory to the charged side of a system such as a split HVAC system. The HVAC system is charged in the factory through a field side connection, shipped charged, and then connected to the remainder of the split system through the field connection. Often the field side connection will be contaminated with lubricants during factory charging, evacuation, pressure testing, during shipping, or during installation. This will leave residual lubricants with entrained refrigerants inside the assembled system. The subsequent vaporization of the entrained refrigerants can falsely indicate system leaks or other contamination problems.

SUMMARY OF THE INVENTION

It is an object, feature and an advantage of the present invention to solve the problems of the prior art.

It is an object, feature and advantage of the present invention to provide a single device which can control the process flow as well as evacuate or charge process fluid into the system.

It is an object, feature and advantage of the present invention to provide a process fitting for a refrigeration system where the external valve core provides a path for charging or evacuating the refrigeration system.

It is an object, feature and advantage of the present invention to eliminate the complex piece of equipment required for connection to a Schraeder valve in favor of a simpler quick connect fitting.

It is an object, feature and advantage of the present invention to provide a process valve which is refrigerant tight when shipped so as to contain refrigerant within a fully charged system and yet provide ready attachments for field installation.

It is an object, feature and advantage of the present invention to eliminate additionally machining and tolerance control on the external aperture for a process fitting.

It is an object, feature and advantage of the present invention to provide a valve body with an internal chamber containing a valve core.

It is an object, feature and advantage of the present invention to provide a quick connect fitting with an extension projecting therefrom.

It is a further object, feature and advantage of the present invention that the extension engage a valve core within a valve body and thereby control access to and from the process stream of a process system.

It is an object, feature and advantage of the present invention to further provide a plug in the internal chamber where the plug controls access to side vent ports.

It is an object, feature and advantage of the present invention to eliminate the Schraeder valve fitting from a refrigerant process fitting.

It is an object, feature and advantage of the present invention to provide a process fitting which eliminates the Schraeder valve in the external valve body.

The present invention provides a valve in valve assembly. The assembly comprises a housing having an internal passage, a valve body in the housing and movably operable to control fluid flow through the passage, and a chamber in the valve body. The chamber is open to the passage at a first chamber end. A valve core in the chamber controls access between the chamber and the passage.

The present invention also provides a refrigeration valve. The valve comprises a housing including first, second and third apertures, a passage in the housing extending between the first and second apertures, and a valve body within the housing and controllable through the third aperture to block or unblock the passage. The valve body includes a chamber in the valve body open to the first and third apertures, and a releasable valve in the chamber.

The present invention additionally provides a service adapter for connecting process fluid to a process system having a system inlet. The service adapter comprises an adapter body having a first end and an internal passageway; a shaft arranged in the internal passageway; and a core depressor extending from the shaft and projecting from the first end a distance greater than passageway's diameter.

The present invention still further provides an assembly for providing a disconnectable connection between a process unit and tubing, each of which contains process fluid. The assembly comprises a first valve operably connected to the process unit, and a second valve connected to the tubing at a first end and having a second end remote from tubing. The first valve has a housing, a body located in the housing and movably operable to control the flow of a process fluid, an aperture in the housing and adapted to receive a portion of the second valve, and an internal valve mechanism arranged within the body. The second valve includes a projection adapted to engage the internal valve mechanism, where the projection extends from the second end of the second valve a distance greater than the length of the portion.

The present invention yet further provides a process fitting. The process fitting comprises a housing including a process inlet and a process outlet and a passage therebetween. The housing also includes an external aperture, and a valve body movably disposed in the chamber and having a first position blocking the passage and a second position allowing process fluid to flow through the passage. The valve body includes an internal chamber open to the external aperture and open to the passage, and a valve core movably disposed in the internal chamber and adapted to block fluid flow through the internal chamber.

The present invention also provides a valve. The valve comprises a housing, first, second and third apertures in the housing, and a passage between the first and second apertures. The valve also includes a valve body movably positioned in the third aperture and adapted to block the passage in a closed valve body position and to unblock the passage in an open valve body position. The valve further includes a chamber in the valve body open to the third aperture and to the passage when the valve body is in the open valve body position, and open to the third aperture and the first aperture when the valve body is in the closed valve body position. A valve core is located in the chamber and is operable between an open position allowing fluid flow through the chamber and a closed position preventing such fluid flow.

The present invention yet further provides a valve body for use in controlling fluid flow through a valve. The valve body includes a body; a chamber within the body and extending therethrough; and a flow control device located within the chamber and adapted to control fluid flow through the chamber.

The present invention still further provides a valve body suitable for use with a new or an existing valve. The valve body includes a longitudinally extending cylindrical body; and a longitudinal chamber in the body and extending the longitudinal length of the body. A first end of the chamber opens at a first end of the body and a second end of the chamber opens at a second end of the body. A fluid flow control device is positioned within the chamber and adapted to control fluid flow therethrough. The present invention further includes a radial passage in the valve body open at a first end to the chamber and open at a second end in the exterior of the body between the first and second body ends The present invention also provides a method of installing an HVAC system having a factory side portion, a field side portion, a valve with an external port, a factory side connection for connection to the factory side portion, and a field side connection for connection to the field side portion. The method comprises the steps of: attaching the factory side connection to the factory side portion; pressure testing the factory side portion through the factory side connection and the external port; evacuating the factory side portion through the factory side connection and the external port; charging the factory side portion through the external port and the factory side connection; and pressure testing the charged factory side portion through the factory side connection and the external port. The present invention additionally provides the further steps of: shipping the HVAC system; installing the HVAC system including connection to the field side portion; evacuating the field side portion through the field side connection and the external port; opening, through the external port, a connection between the field and factory side portions.

The present invention still further provides a method of servicing a closed system having a process fluid. The method comprises the steps of: moving a valve body to block process flow through a passage; attaching a fitting to an external aperture; moving a fitting extension into engagement with a secondary valve core located in a bore in the valve body; depressing a valve stem within the valve core; and accessing the process fluid through the bore.

The present invention finally provides a method of manufacturing a valve. The method comprises the steps of: forming a housing having a first aperture, a second aperture, a third aperture, a first passage in the housing connecting the first and second apertures, and a second passage in the housing connecting the first passage to the third aperture; locating a valve body in the second passage; arranging the valve body to control fluid flow through the first passage; providing a chamber in the valve body, the chamber interconnecting the first passage and the first aperture with the second passage and the third aperture; and positioning a fluid flow control device in the chamber and adapted to control fluid flow through the chamber.

DETAILED DESCRIPTION OF THE INVENTION

The present invention is described in terms of heating, ventilating and air conditioning system (HVAC) to comply with various requirements regarding enabling disclosures, duty of disclosure, and best mode. The invention is more broadly applicable to all process systems which use valves to control the flow of process fluid through the system, and which use valves or fittings to service a process fluid. For purposes of the present invention as described in this specification and claims, process fluid flow shall mean the flow of fluid in a process system, an example being the flow of refrigerant in a refrigeration system through a sequence of condenser, compressor, expansion valve, evaporator and back to the condenser to continue the cycle. Service fluid flow shall refer to fluid flow of the process fluid but not as a part of the primary process. Examples of this are charging the refrigeration system with refrigerant, or monitoring a pressure within the system. The present invention is not intended to be limited to HVAC systems and is intended to encompass all process systems which control a process fluid and which have service fluid flow requirements.

Figure 1:
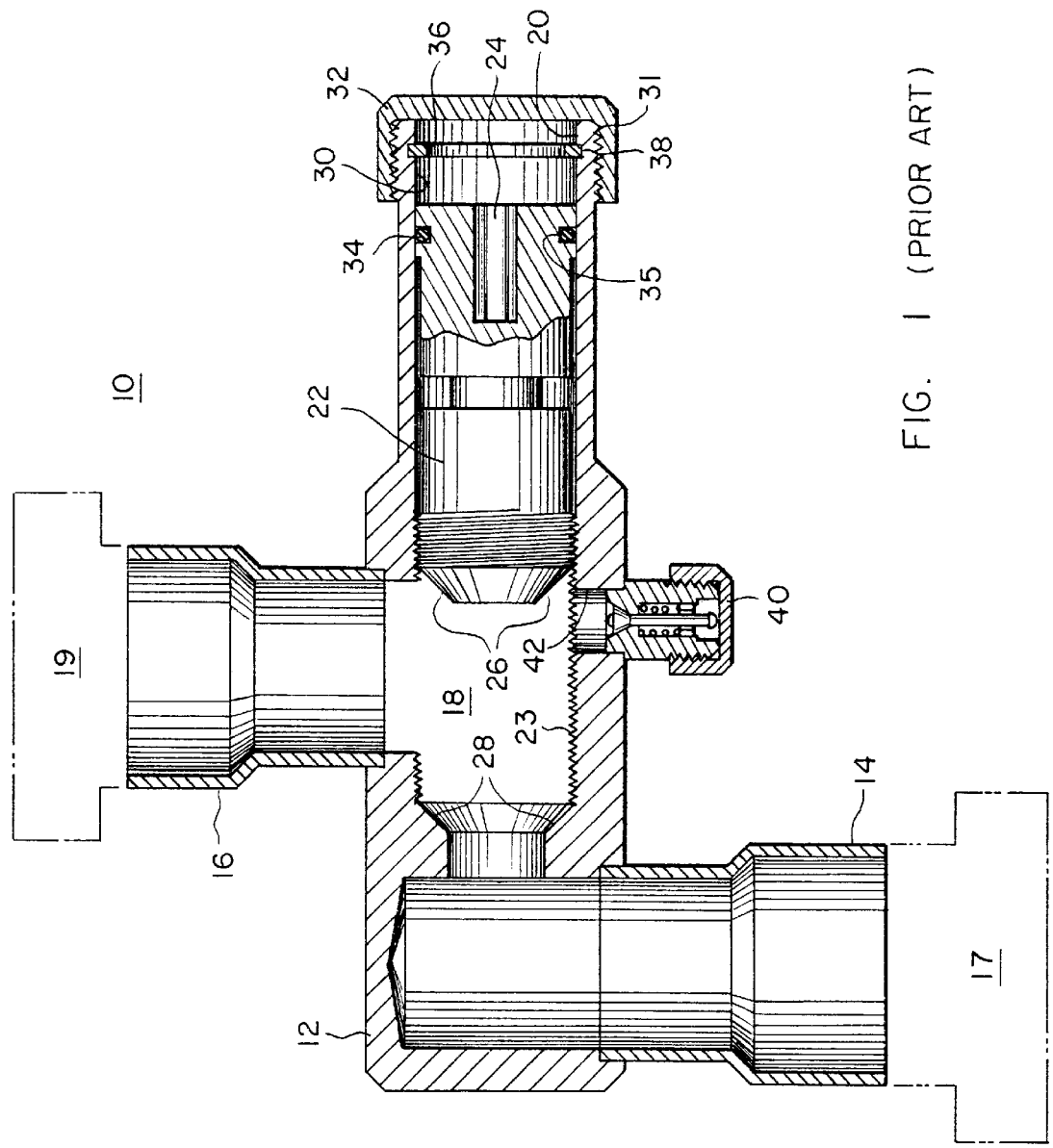
FIG. 1 shows a block diagram of a prior art process valve.

FIG. 1 shows a prior art process valve 10 including a housing 12, a first process aperture 14 connecting to a factory installed portion (factory side) 17 of an HVAC system, a process system or the like, a second process aperture 16 connecting to a field installed portion (field side) 19 of the HVAC system, the process system, or the like, and a passage 18 connecting the first process aperture 14 and the second process aperture 16. The housing 12 includes an external access aperture 20 allowing a cylindrical valve body 22 to be inserted through the external aperture 20 and to control fluid flow through the passage 18.

The valve body 22 includes a socket 24 adapted to receive an Allen wrench so as to control the position of the valve body 22 by advancing or withdrawing the valve body 22 along threads 23. FIG. 1 shows the valve body 22 in an open position allowing a process fluid to flow through the passage 18. When an Allen wrench is placed in the socket 24 and used to advance the valve body 22, annular sealing surfaces 26 of the valve body 22 will engage annular sealing surfaces 28 of the housing 12 and thereby block fluid flow through the passage 18.

The valve body 22 is positioned in a housing extension 30 located between the passage 18 and the external access aperture 20, allowing the valve body 22 to be moved into and out of the passage 18. The housing extension 30 is sealed by a cap 32 which is conventionally and externally attached to the housing extension 30, preferably by threads 31 so as to block the external access aperture 20. A seal 34 such as an o-ring is provided in a circular groove 35 in the valve body 22 to prevent process fluid from the passage 18 from leaking around the valve body 22 to the external aperture 20. A retaining clip 36 is located at the cap end 38 of the housing extension 30 and projecting inwardly enough to prevent the valve body 22 from being accidentally removed from the housing extension 30.

The housing 12 also includes a Schraeder valve 40 conventionally and sealingly attached to a Schraeder valve aperture 42. The Schraeder valve 40 is open around the valve body 22 to the field side 19 to allow process fluid to be charged or evacuated to the field side if desired even if the valve body 22 is blocking the passage 18.

Prior to shipping the pre-charged factory side 17 of the system, the factory side is charged in the open position shown in FIG. 1 by connecting a charging unit to the second aperture 16. Refrigerant charge passes through the passage 18 and the first process aperture 14 into the factory side 17 of an HVAC system or the like. The valve body 22 is then moved into sealing engagement with the surfaces 28 of the housing 12 thereby blocking the passage 18 and sealing the factory side 17. This allows the factory side 17 of the system to be shipped fully charged with refrigerant or process fluid. Upon field installation, the remainder of the system, the field side 19, is connected to the second aperture 16. The Schraeder valve 40 is then used to evacuate the field side through the second aperture 16. The valve body 22 is then backed off to the open position shown in FIG. 1 and refrigerant charge is allowed to flow from the factory side to the field side, fully charging the HVAC system. As noted previously, residual oils containing entrained refrigerants and other contaminants may enter the system from the various connections made to the second process aperture 16. Additionally, the cost adding Schraeder valve 40 is required in these prior art systems.

Figure 2:
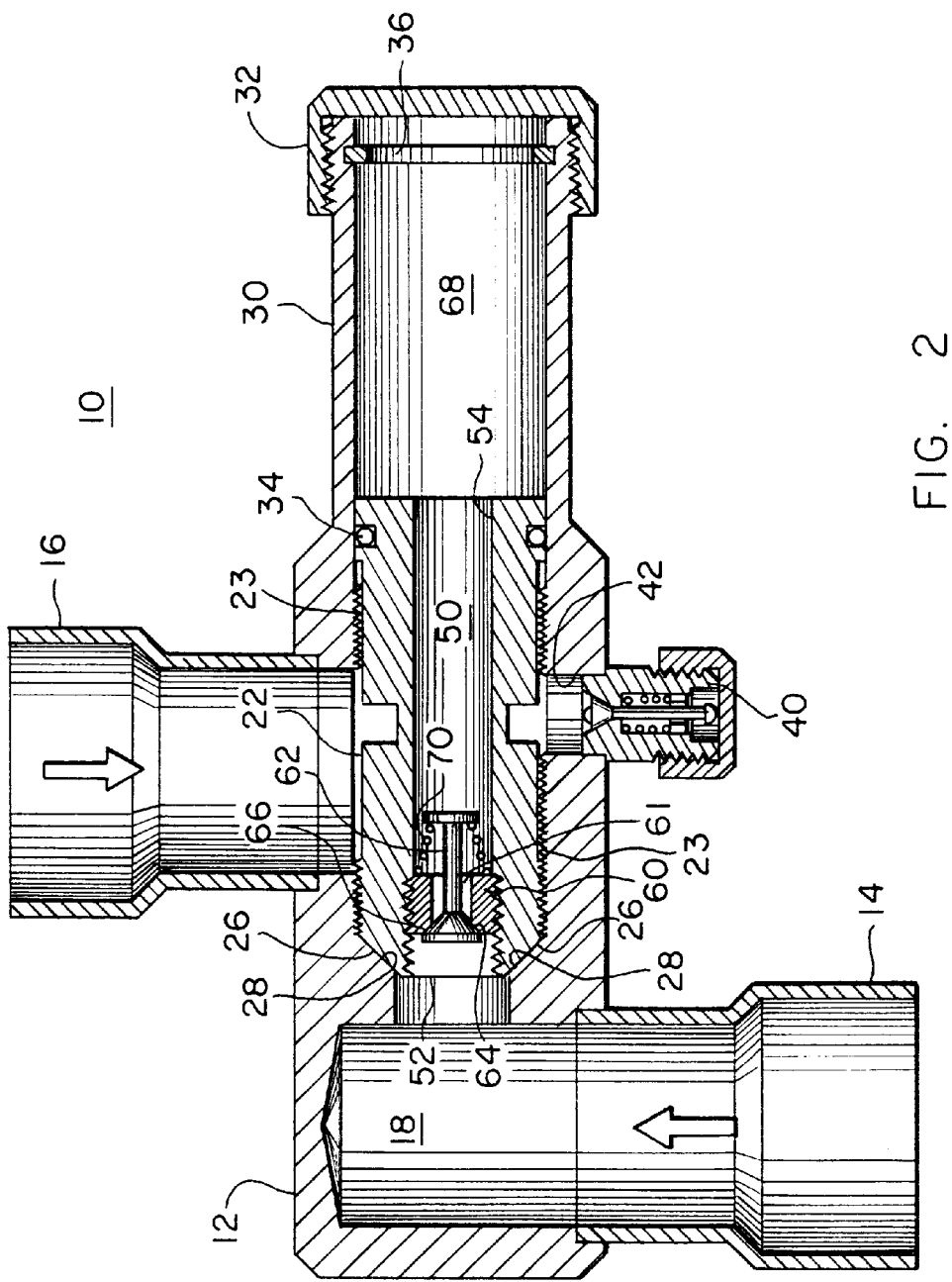
FIG. 2 shows a block diagram of a process valve of the present invention in the closed, or process blocking, position.

The present invention is directed to an improved valve which allows a process system to be evacuated, charged or otherwise vented to atmosphere or to a suitable device without opening the valve from a valve seat 28 and without exposing any other open ports. The improved valve is shown in FIG. 2 where like reference numerals are used for like elements. Control of both vaporous and liquid fluid is contemplated, particularly including liquid and vaporous refrigerants.

In the invention, the valve body 22 is modified to include a longitudinal chamber 50 extending the length of the valve body 22 from a process opening 52 to an external opening 54. The process opening 52 is open to the passage 18, and the external opening 54 is open to the external aperture 20. A fluid flow control device such as a valve core 60 is located in the chamber 50, preferably proximal to the process opening 52. The valve core 60 controls fluid flow through the chamber 50. The valve core 60 includes a bore 61 containing a secondary valve stem 62 which is preferably biased in a closed position such as shown in FIG. 2. In this closed position, sealing surfaces 64 on the secondary valve stem 62 engage sealing surfaces 66 on the valve core 60 to prevent process fluid from entering either the chamber 50 or a chamber 68 formed in the housing extension 30 between the valve body 22 and the external aperture 20. The secondary valve stem 62 is biased in this closed position by a biasing spring 70 as well as the pressure exerted against the sealing surfaces 64, 66 by the process fluid. Other biasing mechanism are contemplated.

Figure 3:
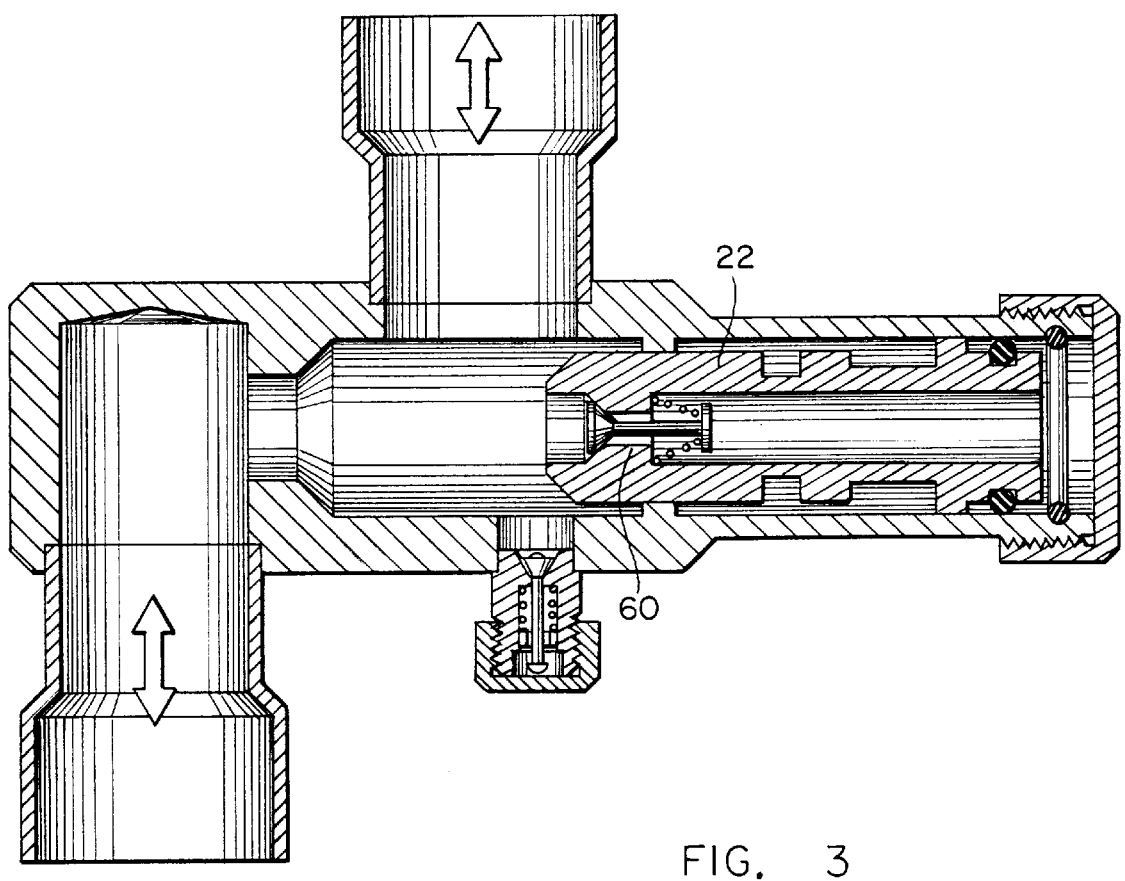
FIG. 3 shows the valve of FIG. 2 in the open position.

In FIG. 2, the valve core 60 is in threaded engagement with the valve body 22. FIG. 3 is essentially identical to FIG. 2 but showing the valve body 22 in the open position and showing that the valve core 60 can be formed as a unitary piece with the valve core 60 formed integrally with the valve body 22. FIG. 3 also shows, by bi-directional arrows, that fluid flow through the passage 18 can be in either direction, such as occurs in a heat pump HVAC system.

Figure 4:
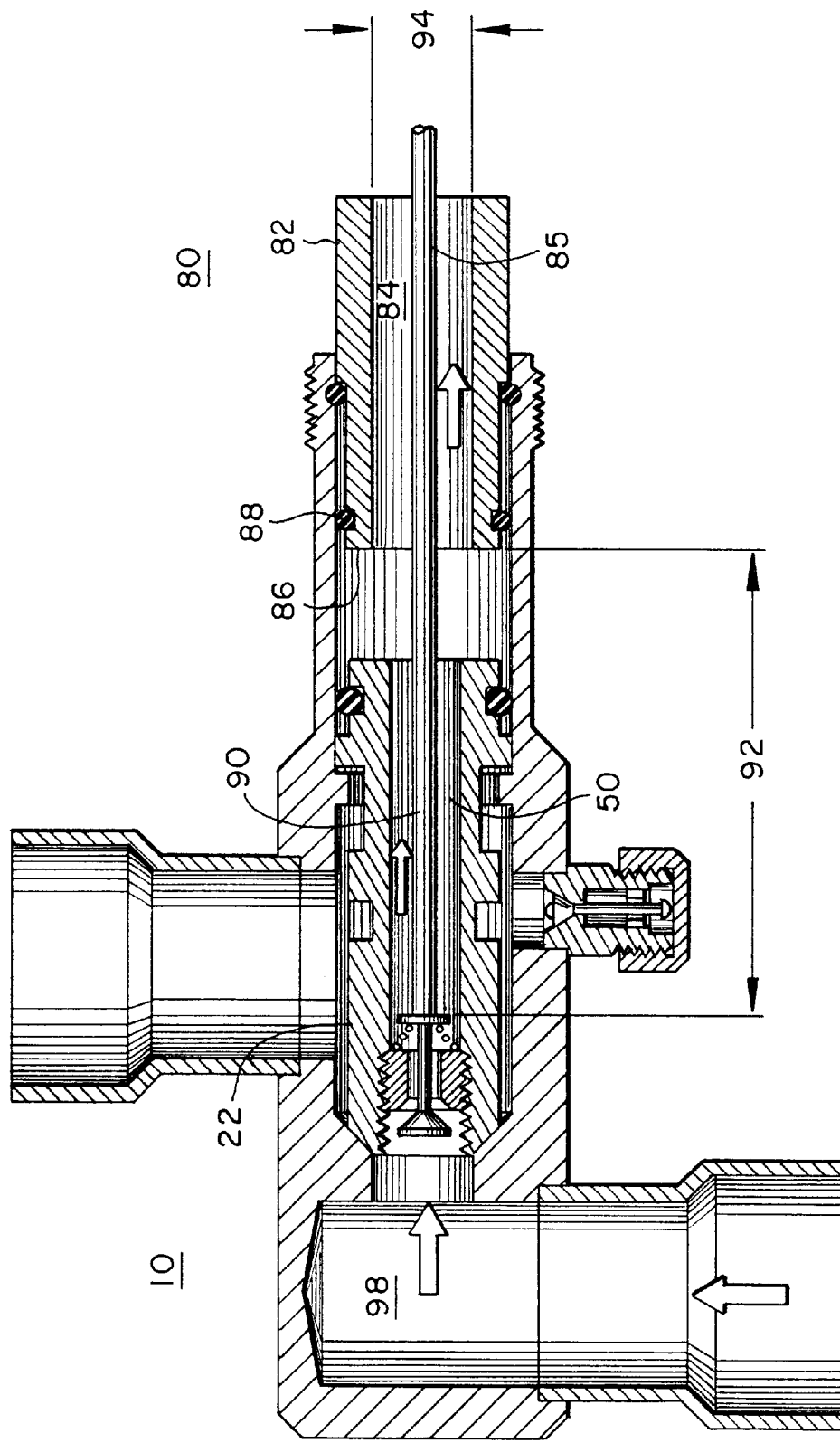
FIG. 4 shows a block diagram of the valve of FIG. 2 with a quick connect fitting and an extended depressor activating the core of the present invention.

FIG. 4 shows process fluid being evacuated using a valve 10 and a service adapter 80 in accordance with the present invention. The valve body 22 is positioned in the closed position so that the passage 18 is blocked and there is no connection between the second aperture 16 and the chamber 50 or between the field side 19 and the factory side 17.

Figure 8:
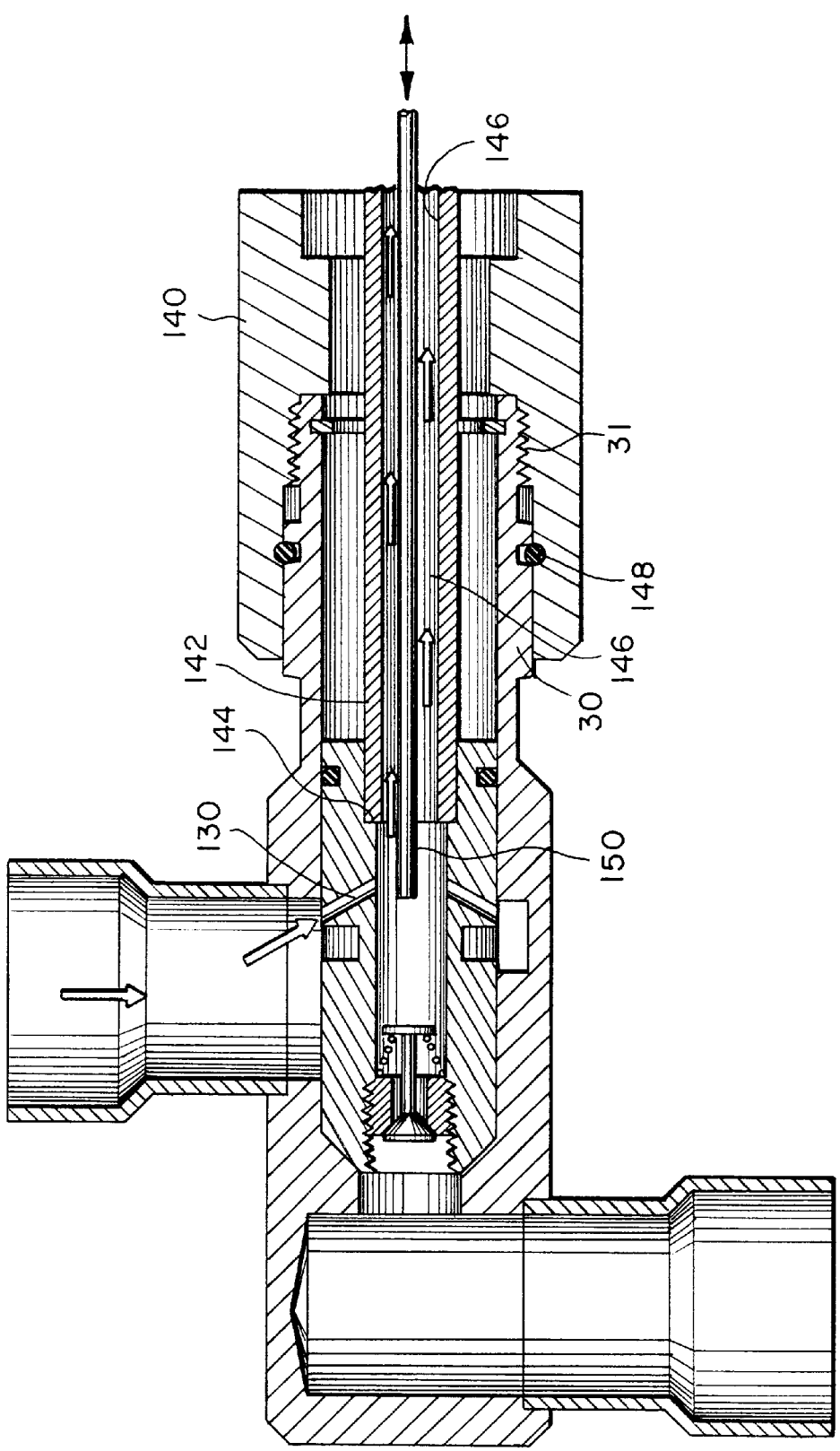
FIG. 8 shows the vent ports in the valve of FIG. 7 with the addition of a quick connect fitting and an extended depressor.

The service adapter 80 includes a body 82 and an internal passageway 84 for passing a fluid. The adapter body 82 includes a first end 86 adapted to engage the housing extension 30 either internally as shown in FIG. 4 or externally as shown in FIG. 8. A seal 88 such as an o-ring, is provided at the first end 86 between the adapter body 82 and the housing extension 30 prevent fluid from leaking between the body 82 and the housing extension 30. The seal 88 is preferably formed of a compressible material.

The service adapter 80 includes a shaft 85 located in the internal passageway 84 and having an extensor portion, such as a core depressor 90 of the shaft 85, projecting from and past the first end 86. Although not mandatory to extend so far, the core depressor 90 preferably extends a distance 92 greater than the diameter 94 of the internal passageway 84 and may, as shown in FIG. 4, extend considerably farther. Preferably, the core depressor 90 is axially extendible relative to the body 82 of the service adapter 80. The core depressor 90 projects, or is extended, a distance sufficient to engage the secondary valve stem 62 and bias the secondary valve stem 62 to an open position. This opens a fluid path between the first aperture 14 and the internal passageway 84 of the service adapter 80. Process fluid can be evacuated through the first aperture 14, a portion 98 of the passage 18, the bore 61, the chamber 50, the chamber 68, and the internal passageway 84 in the service adapter 80. Process fluid can also be charged into the system by reversing the direction of the flow. Pressure testing can also be accomplished through this path by connecting a pressure sensor to the internal passageway 84.

Suitable external fittings are manufactured by Aeroquip as shown in U.S. Pat. Nos. 3,916,947 to Holmes et al., 5,139,049 to Jensen et al., 5,339,862 to Haunhorst, and 5,415,200 to Haunhorst et al. all of which are hereby incorporated by reference herein, and are suitable for use with the present invention with the addition of the extensor portion.

Figure 5:
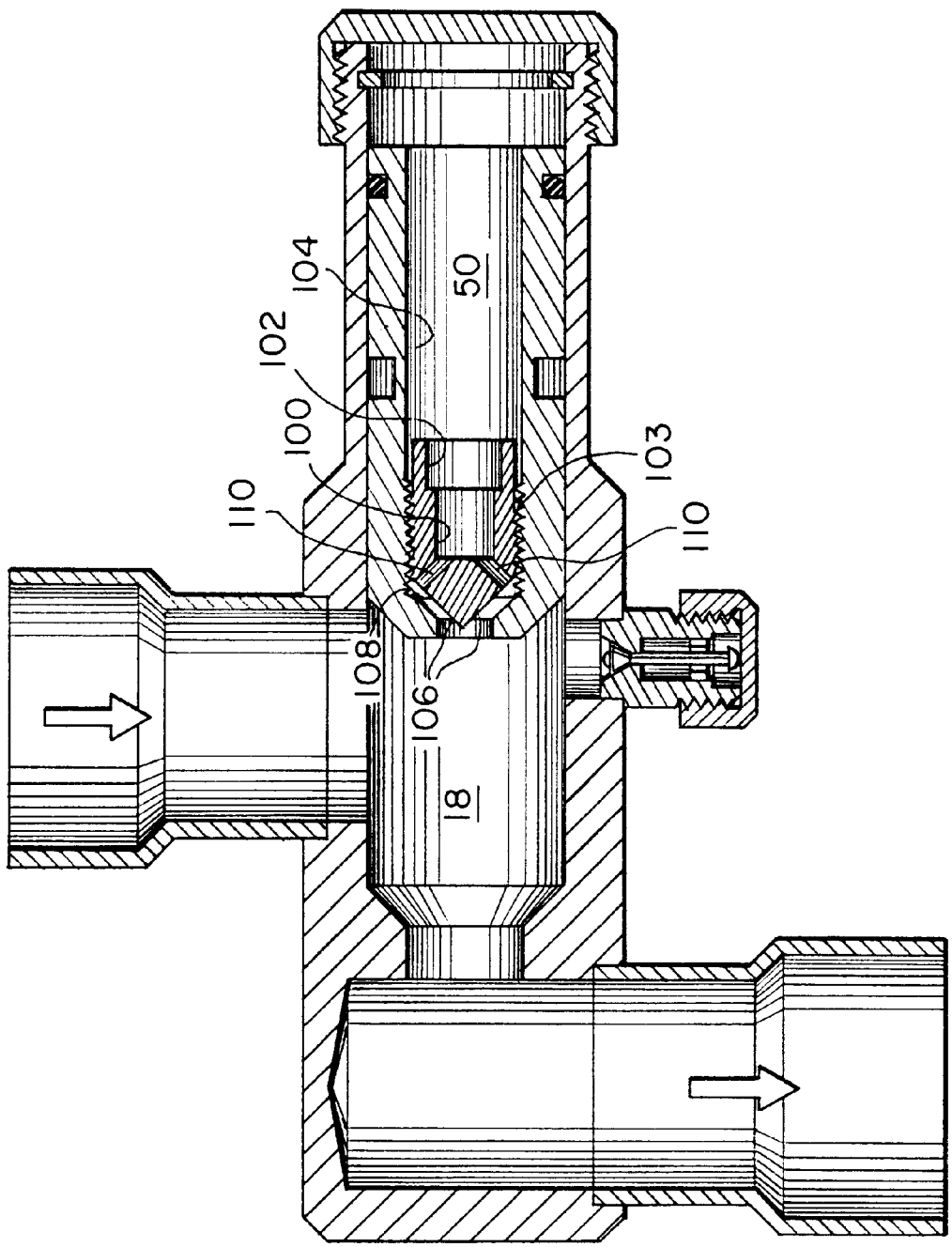
FIG. 5 is a block diagram of the present invention as shown in FIG. 3 but with a Bristol fitting instead of the valve core.

FIG. 5 shows an alternative embodiment of the present invention including a Bristol fitting 100 in place of the valve core 60. The Bristol fitting 100 includes an Allen wrench fitting 102 and threads 103 which engage the interior walls 104 of the chamber 50. The Allen wrench fitting 102 is used to move an annular sealing surface 106 of the Bristol fitting 100 into and out of engagement with an annular seat 108 in the valve body 22. When the Bristol fitting 100 is engaged with the seat 108, passages 110 in the Bristol fitting are blocked. When the Bristol fitting 100 is backed off through the use of an Allen wrench, the passage 18 is open to the passage 110 and, by means of an interior chamber 112 in the Bristol filling 100, to the chamber 50. In other respects, the alternative embodiment with the Bristol fitting 100 operates similarly to the preferred embodiment previously discussed.

Figure 6:
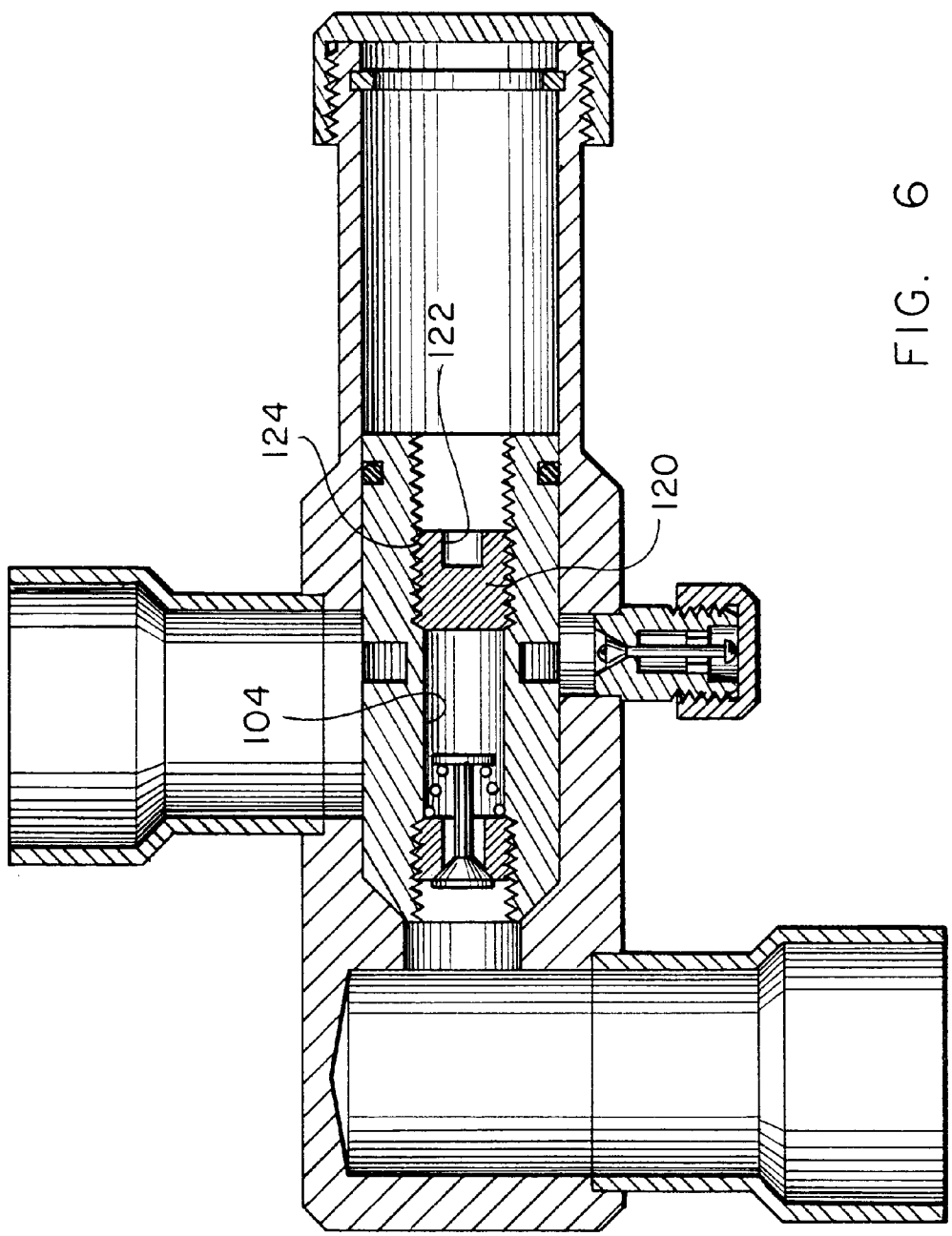
FIG. 6 is a block diagram of the present invention as shown in FIG. 2 with the addition of a secondary plug.

FIG. 6 shows the present invention as depicted in FIG. 3 with the inclusion of a secondary plug 120 blocking flow through the chamber 50. The secondary plug includes a fitting 122 suitable for use with an Allen wrench or the like for insertion and removal of the secondary plug 120. The secondary plug 120 is preferably threadably engaged by threads 124 with the walls 104 of the chamber 50 and provides additional protection against any leakage. If the threads 23 are right hand threads, the threads 124 are preferably wound oppositely, i.e. left hand threads.

Figure 7:
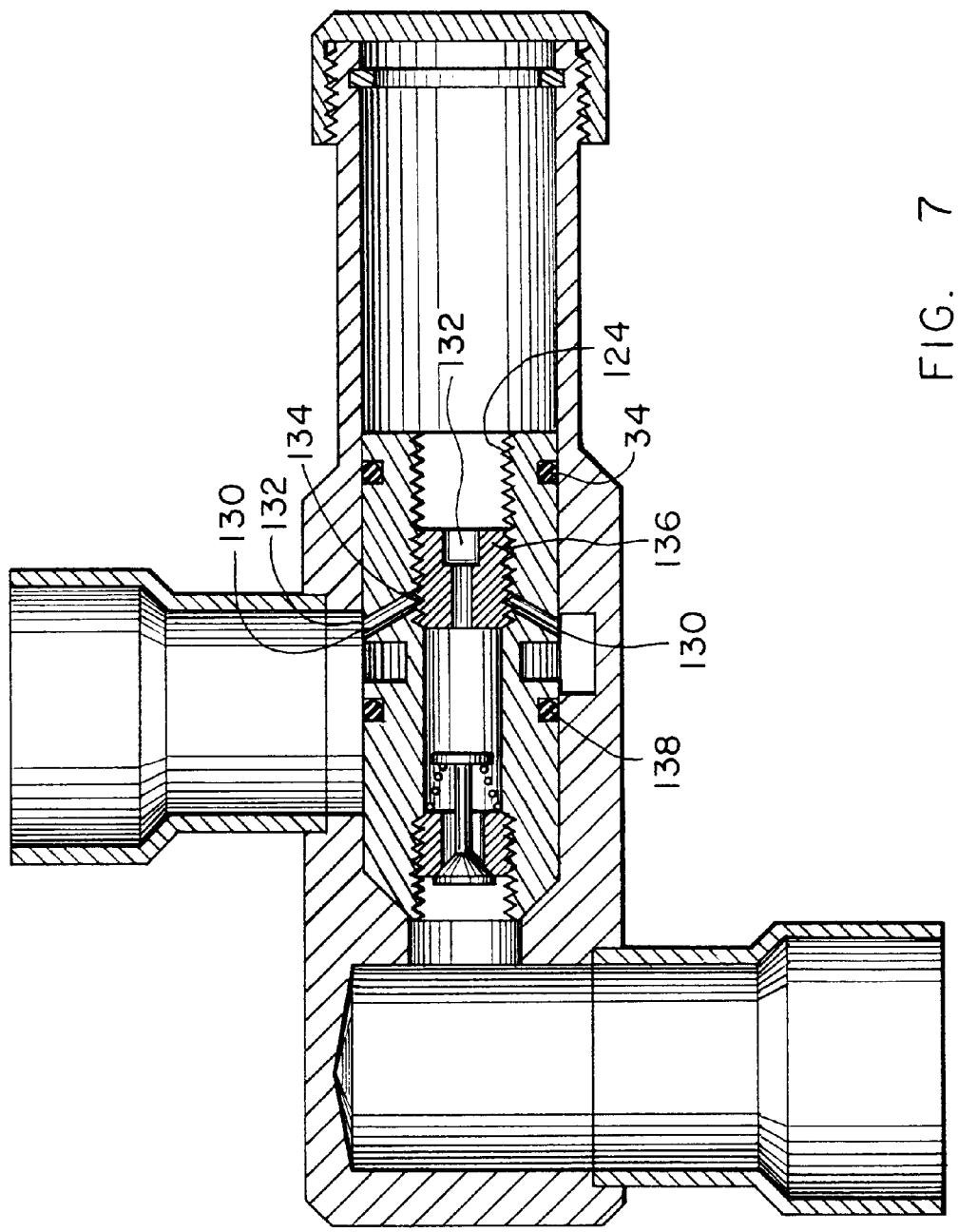
FIG. 7 shows the invention of FIG. 6 with the addition of field processing vent ports.

FIG. 7 shows an important alternative embodiment which includes field processing vent ports 130 in the valve body 22. These vent ports 130 are radial passages in the valve body 22 open to the exterior of the valve body 22 at one end 132 of the vent port 130 and open to the chamber 50 at the other end 134 of the vent port 130. The addition of these vent ports 130 allows the complete elimination of the external Schraeder valve 40. To seal the vent ports 130 from use, a hollow secondary plug 136 is preferably used to block these vent ports 130 by traveling along the threads 124 to the blocked position shown in FIG. 7. When unblocked by moving the hollow secondary plug 136 back along the threads 124, the vent ports 130 allow process fluid to be exchanged between the second aperture 16 and the chamber 68 by means of the chamber 50 and the vent ports 130. This is particularly useful in balancing the pressure on either sides of the seal 34 and in accessing process flow in the factor side 19 through the second aperture 16, even when the passage 18 is blocked as shown in FIG. 7. To avoid potential leak paths, an additional seal 138 is preferably provided so that when the valve body 22 is moved toward the chamber 68, as shown in FIG. 9, the housing extension 30 and the seals 34, 138 blocks access to the vent port 130, even when the hollow secondary plug 136 is in the open position.

FIG. 8 shows the use of these vent ports 130 in evacuating process fluid from the second aperture 16. An external quick connect fitting 140 including an extension tube 142 is engaged to a valve seat 144 added to the valve body 22. The hollow interior of the extension tube 142 provides a passage 146 for the evacuation of process fluid from the second aperture 16 and passage 18 through the vent ports 130, the chamber 50, and the passage 146. The inclusion of an extensor, such as a longitudinally moveable extended core depressor 150 within the extension tube 142, allows access to process fluid through the chamber 50, the core body 60, and the first aperture 14 when the secondary valve stem 62 is depressed by axially extending the core depressor 150. The external quick connect fitting 140 can slideably attach to the housing extension 30 if a compressible seal 146 is included either in the housing extension 30 or on the fitting 140. Alternatively, the external fitting 140 may be threadably attached to threads 31 such as shown in FIG. 9.

Figures 9, 10, 11:
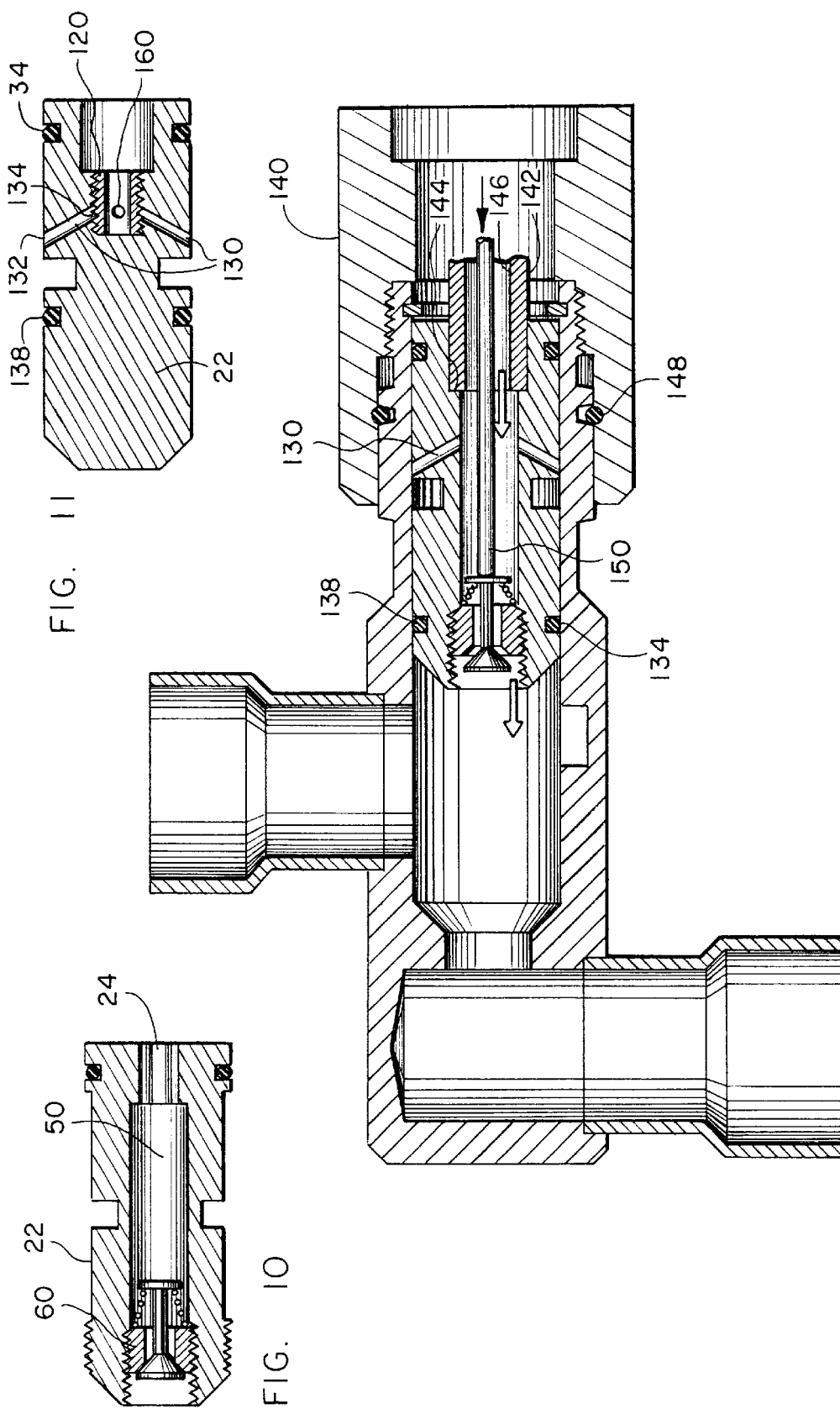
FIG. 9 is a block diagram of the present invention as shown in FIG. 8 where a system is being charged through the external aperture.
FIG. 10 shows a valve body in accordance with the present invention.
FIG. 11 shows an alternative embodiment of a valve body of the present invention.

FIG. 9 shows the valve stem in the open position with the core depressor 150 contacting the secondary valve stem 62 and biasing the secondary valve stem 62 to its open position. This allows process fluid to be added to or removed from the passage 18 or pressure monitored without interrupting the operation of the process and without interrupting the process fluid flow through the passage 18.

FIG. 10 shows the valve body 22 of FIG. 2 as applicable to a retrofit market. If the tolerance is in dimensions of a housing 12 are known, the valve body 22 of the present invention can be manufactured and retrofit to existing valves including using a valve core 60 and vent ports 130, either individually or in combination. Each of the valve bodies shown in FIGS. 2–9 can be manufactured and retrofit to existing valves.

FIG. 11 shows an alternative embodiment of the valve body 22 of the present invention wherein the alternative embodiment includes the vent ports 130 and a secondary plug 120 but does not include a chamber 50 and the valve core therein. This alternative embodiment valve body is retrofitable to an existing valve or applicable to a new valve in cases where access to the field side 19 is desirable but access to the factory side 17 is unimportant. The secondary plug 120 seals the vent ports 130 when in the position shown in FIG. 11 but can be backed off to allow fluid flow through the vent ports 130 and the hollow interior of the secondary plug 120 as previously described. Additionally, in a further modification, the secondary plug 120 may include at least one access aperture 160 rotatably alignable with the vent ports 130 to allow service fluid to pass through the vent port 130 and the aperture 160 when the aperture 160 is aligned with a vent port 130. By rotating the position of the aperture 160, the secondary plug 120 can be used as a flow control device.

The present invention provides a modified process fitting allowing access to the process through a valve core. The present invention particularly applies to all split system HVAC systems where a factory side is shipped charged with refrigerant and a field side is subsequently attached thereto. However, a person of ordinary skill in the art will recognize that the present invention and its components are relevant to other than HVAC systems. That same person of ordinary skill in the art will recognize the general applicability of the invention to other applications and will recognize that many alternations and modifications could be made to the present invention. All modifications and alterations and all other applications are contemplated to fall within the present invention as defined by the claims appended hereto.

What is desired to be secured by Letters Patent of the United States is set forth in the following claims:

1. A method of installing and servicing an HVAC system comprising the steps of:

providing a housing having an internal passage, a valve body in the housing moveably operable to control process fluid flow through the passage, a chamber in the valve body open to the internal passage at a first chamber end, and a secondary valve stem in the chamber and controlling access therethrough;

attaching a service adapter to a second end of the chamber, the service adapter including a body arranged about an internal passageway, a first end on the body, a shaft in the internal passageway, and an extensor portion projecting from the shaft past the first end;

contacting the secondary valve stem with the extensor portion of the service adapter;

biasing the secondary valve stem with the extensor portion to an open position allowing service fluid flow through the chamber; and servicing process fluid through the chamber.

2. The method of claim 1 wherein the servicing step includes the step of evacuating process fluid.

3. The method of claim 2 wherein the servicing step includes the further step of testing a pressure of the process fluid.

4. The method of claim 2 wherein the servicing step includes the further step of charging process fluid into the system.

5. The method of claim 4 wherein the servicing step includes the further step of testing the pressure of the process fluid.

6. The method of claim 1 wherein the servicing step includes the further step of charging process fluid into the HVAC system through the chamber.

7. The method of claim 1 wherein the servicing step includes the further step of testing the pressure of the process fluid.

8. The method of claim 1 wherein the attaching step includes the further step of sealingly engaging the service adapter with the housing.

9. The method of claim 1 wherein the servicing step includes the steps of adding or removing process fluid without interrupting the operation of the process and without interrupting the flow of process fluid through the internal passage.

10. The method of claim 1 wherein the servicing step includes the step of monitoring the pressure of the process fluid without interrupting the operation of a process and without interrupting the flow of process fluid to the internal passage.

11. The method of claim 1 including the further step of engaging sealing surfaces on the service adapter with sealing surfaces on the secondary valve stem to prevent process fluid from entering the chamber when the secondary valve stem is in a closed position.

12. The method of claim 1 wherein the servicing step includes further steps of:

moving the valve body into sealing contact with the housing so as to block fluid flow through the internal passage; and evacuating, charging or venting coolant from the system without disengaging the valve body from the sealing contact with the housing.

* * * * *